(No Model.)
G. W. MERK.
COOKING UTENSIL.
No. 471,058. Patented Mar. 15, 1892.
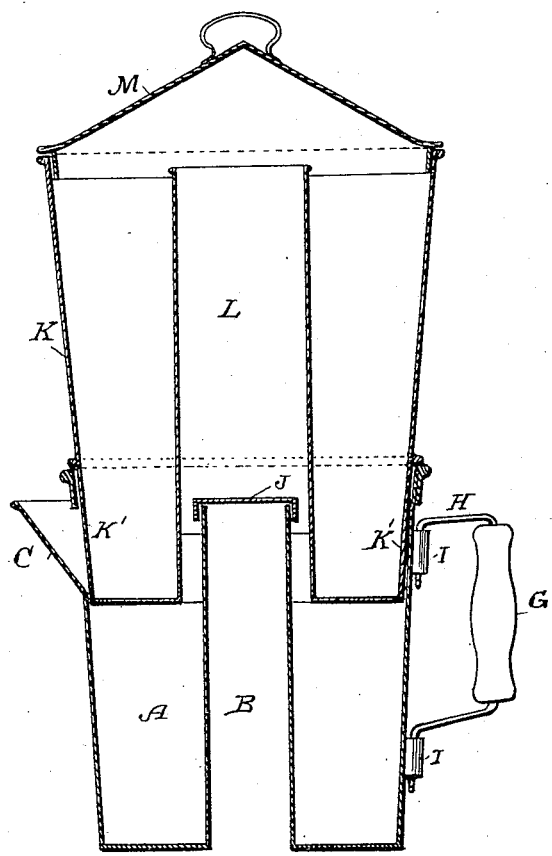
Witnesses,
J. H. Strouse
J. A. Bayless
Inventor,
George W. Merk,
By Dewey & Co.
atty

UNITED STATES PATENT OFFICE.

GEORGE W. MERK, OF SAN FRANCISCO, CALIFORNIA.

COOKING UTENSIL.

SPECIFICATION forming part of Letters Patent No. 471,058, dated March 15, 1892.

Application filed March 13, 1891. Serial No. 384,940. (No model.)

*To all whom it may concern:*

Be it known that I, GEORGE W. MERK, a citizen of the United States, residing in the city and county of San Francisco, State of California, have invented an Improvement in Cooking Utensils; and I hereby declare the following to be a full, clear, and exact description of the same.

My invention relates to a novel cooking utensil, which is applicable for various purposes.

It consists in certain details of construction, which will be more fully explained by reference to the accompanying drawing, in which the figure is a vertical section, showing the two sections, the one within and above the other.

A is a vessel of any suitable dimensions, which is adapted to be used upon the top of a stove or other heater. It is made of sheet or cast metal and has a hole in the bottom with an open tube B, extending centrally upward to a point near the top of the vessel A. Upon one side of this vessel is a nozzle or spout C, from which water contained in the vessel may be poured at will. This spout is a little lower than the top of the vessel and the top of the central tube, and thus prevents the vessel being filled so full that it will overflow into the central tube.

G is a handle fixed upon the wires or brackets H, which serve to retain it at a sufficient distance from the side of the vessel A. Upon the side of this vessel, opposite to the nozzle C, are fixed the vertical cylindrical sockets I, and the wires H are bent so as to stand parallel with the sides of the vessel A, and they may be slipped into the sockets I, thus attaching the handle to the utensil.

When the utensil is to be transported and it is desirable to pack it closely, the handle H is slipped out of the sockets I and may be packed within the vessel or separately, as desired. These handles are held in place by turning the lower ends of the wire a little to one side, so that they cannot be easily withdrawn from the sockets.

The top of the tube B is provided with a cap or cover J, by which it is closed when the vessel is to be used for cooking or for heating water over an open fire, when it is desirable to prevent smoke and products of combustion from passing up through the tube B and entering the vessel.

The utensil may be used either upon the top of a hot stove or range, or a cover of the range may be removed, so that the heat of the stove will pass directly up the tube B to apply the heat more directly and rapidly, when necessary. When it is desired to use the device as a steamer, I employ the upper chamber or vessel K, which is fitted to set into the top of the vessel A, after the cover D has been removed. This vessel K projects into the vessel A, as shown at K', so that when the upper vessel is in place this extension covers the entrance to the spout C, so as to prevent any escape of steam in that direction. The vessel K has a central tube L, open at bottom and top and of larger diameter than the tube B, so that when the latter is in place upon the top of the vessel A, the tube L extends a short distance below the end of the tube B, and from its greater size leaves an annular space all around this tube. The cap or cover J being placed upon the tube B, it will be manifest that when the water in the vessel A is boiled the steam will pass up into the tube L and, passing out through the top of the tube, will be available for steaming the contents of the vessel K. This vessel has a conical cover M, which is placed upon it when it is in use. By this construction I provide a convenient utensil for several forms of cooking.

Having thus described my invention, what I claim as new, and desire to secure by Letters Patent, is—

1. A cooking utensil consisting of a lower vessel having a central open tube provided at its upper end with a removable cap or cover and an upper vessel having a central open tube of larger diameter than the tube of the lower vessel, said upper vessel being adapted to enter the upper end of the lower vessel and extend below the upper end of the tube thereof, whereby it incloses said tube and forms an annular channel around it opening into the lower vessel, substantially as herein described.

2. A cooking utensil consisting of the cylindrical lower vessel having a central open tube provided at its upper end with a removable cap or cover, said vessel having a spout-opening at one side, and an upper vessel having an open tube of larger diameter than the tube of the lower vessel, said upper vessel entering the upper end of the lower vessel to close the spout-opening thereof and to permit its tube to inclose the upper end of the tube of the lower vessel and form an annular channel around it communicating with the lower vessel, substantially as herein described.

In witness whereof I have hereunto set my hand.

GEORGE W. MERK.

Witnesses:
S. H. NOURSE,
J. A. BAYLESS.